(12) United States Patent
Doshi et al.

(10) Patent No.: US 6,192,515 B1
(45) Date of Patent: Feb. 20, 2001

(54) METHOD FOR SOFTWARE PIPELINING NESTED LOOPS

(75) Inventors: Gautam Doshi, Sunnyvale, CA (US); Robert Norin, Tigard, OR (US)

(73) Assignee: Intel Corporation, Santa Clara, CA (US)

( * ) Notice: Under 35 U.S.C. 154(b), the term of this patent shall be extended for 0 days.

(21) Appl. No.: 09/118,603

(22) Filed: Jul. 17, 1998

(51) Int. Cl.[7] ....................................... G06F 9/45
(52) U.S. Cl. ................................. 717/9; 712/241
(58) Field of Search ............................ 717/5–9; 712/226, 712/241, 245

(56) References Cited

U.S. PATENT DOCUMENTS

| | | | |
|---|---|---|---|
| 5,051,896 | * 9/1991 | Lee et al. | 712/226 |
| 5,481,723 | * 1/1996 | Harris et al. | 395/706 |
| 5,724,565 | * 3/1998 | Dubey et al. | 712/245 |
| 5,794,029 | * 8/1998 | Babaian et al. | 712/241 |
| 5,920,724 | * 7/1999 | Chang | 395/709 |

OTHER PUBLICATIONS

Milicev et al. "Predicated software pipelining technique for loops with conditions", IEEE, 1998, pp. 176–180.*
Wolf et al., Combining loop transformations considering cahes and scheduling, IEEE, 1996, pp. 274–286.*
Vegdahl, "A dynamic programming technique for compacting loops", IEEE 1992, pp. 180–188.*
Dulong, "The IA–64 architecture at work", IEEE, 1998, pp. 24–32.*
Sha et al., "Polynomial time nested loop fusion with full parallelism", IEEE, 1996, pp. 9–16.*

* cited by examiner

*Primary Examiner*—Kakali Chaki
(74) *Attorney, Agent, or Firm*—Leo V. Novakoski (57) ABSTRACT

A method for software pipelining nested loops combines the inner and outer loops of the nested loop to form a merged loop. One or more operations from the outer loop are activated on selected passes through the merged loop, and the merged loop is software pipelined.

25 Claims, 5 Drawing Sheets

| Row | Col1 | Col2 | Col3 | Col4 | Col5 |
|---|---|---|---|---|---|
| 350(1) | G(1,0) | NOP | NOP | NOP | NOP |
| 350(2) | A(1,1) | NOP(G) | NOP | NOP | NOP |
| 350(3) | B(1,1) | A(1,2) | NOP(G) | NOP | NOP |
| 350(4) | C(1,1) | B(1,2) | A(1,3) | NOP(G) | NOP |
| 350(5) | NOP(H) | C(1,2) | B(1,3) | A(1,4) | NOP(G) |
| 350(6) | NOP(H) | C(1,3) | B(1,4) | A(1,5) | NOP(G) |
| ⋮ | | | | | |
| 350(K+1) | NOP(H) | C(1,K-2) | B(1,K-1) | A(1,K) | G(2,0) |
| 350(K+2) | NOP(H) | C(1,K-1) | B(1,K) | A(2,1) | NOP(G) |
| 350(K+3) | NOP(H) | C(1,K) | B(2,1) | A(2,2) | NOP(G) |
| 350(K+4) | H(1,K) | C(2,1) | B(2,2) | A(2,3) | NOP(G) |
| 350(K+5) | NOP(H) | C(2,2) | B(2,3) | A(2,4) | NOP(G) |
| ⋮ | | | | | |
| 350(J*K+1) | NOP(H) | C(J,K-2) | B(J,K-1) | A(J,K) | G(J+1,0) |
| 350(J*K+2) | NOP(H) | C(J,K-1) | B(J,K) | A(J+1,1) | NOP(G) |
| 350(J*K+3) | NOP(H) | C(J,K) | B(J+1,1) | A(J+1,2) | NOP(G) |
| 350(J*K+4) | H(J,K) | C(J+1,1) | B(J+1,2) | A(J+1,3) | NOP(G) |
| 350(J*K+5) | NOP(H) | C(J+1,2) | B(J+1,3) | A(J+1,4) | NOP(G) |
| ⋮ | | | | | |
| 350((M-1)*K) | NOP(H) | C(M-1,K-3) | B(M-1,K-2) | A(M-1,K-1) | NOP(G) |
| 350((M-1)*K+1) | NOP(H) | C(M-1,K-2) | B(M-1,K-1) | A(M-1,K) | G(M,0) |
| 350((M-1)*K+2) | NOP(H) | C(M-1,K-1) | B(M-1,K) | A(M,1) | NOP(G) |
| 350((M-1)*K+3) | NOP(H) | C(M-1,K) | B(M,1) | A(M,2) | NOP(G) |
| 350((M-1)*K+4) | H(M-1,K) | C(M,1) | B(M,2) | A(M,3) | NOP(G) |
| 350((M-1)*K+5) | NOP(H) | C(M,2) | B(M,3) | A(M,4) | NOP(G) |
| ⋮ | | | | | |
| 350(M*K) | NOP(H) | C(M,K-3) | B(M,K-2) | A(M,K-1) | NOP(G) |
| 350(M*K+1) | NOP(H) | C(M,K-2) | B(M,K-1) | A(M,K) | NOP(G) |
| 350(M*K+2) | NOP | NOP(H) | C(M,K-1) | B(M,K) | NOP |
| 350(M*K+3) | NOP | NOP | NOP(H) | C(M,K) | NOP |
| 350(M*K+4) | NOP | NOP | NOP | H(M,K) | NOP |
| 350(M*K+5) | NOP | NOP | NOP | NOP | NOP(H) |

METHOD FOR SOFTWARE PIPELINING NESTED LOOPS

BACKGROUND OF THE INVENTION

1. Technical Field

The present invention relates to methods for optimizing computer code, and in particular, to methods for software pipelining nested loops.

2. Background Art

Loops are software structures that allow programmers to perform repeated operations using a single set of instructions. A typical source code loop begins with a loop instruction, e.g. a "Do", "While" or equivalent statement, followed by the set of instructions ("loop body") to be repeated. Arguments associated with the loop instruction control the repetition of the loop body. These arguments include a test for terminating the loop ("loop test"). The loop test is typically a logical function of a variable that is modified by the loop. It controls a branch instruction that either exits (terminates) the loop or returns to the first instruction of the loop body, depending on whether the test is true or false, respectively. In counted loops, the loop variable is an index that is incremented each time the instructions of the loop body are executed, and the loop test compares the index with a maximum value.

Loops are nested when the body of one loop (the "outer loop") includes another loop (the "inner loop"). Perfectly nested loops are those in which the outer loop includes no instructions but those of the inner loop. Imperfectly nested loops are those in which the outer loop includes instructions in addition to those of the inner loop. In either case, each time the outer loop is executed, the instructions that form its loop body, including the inner loop, are executed. That is, the inner loop is fully executed on each repetition of the outer loop. The number of times the inner loop is executed for each iteration of the outer loop is a function of the inner loop test and the loop variable tested.

Depending on how they are implemented, loops can have a significant impact on the performance of a program. For example, the loop test is a branch condition which, if mispredicted, requires the processor to flush the current instructions from its pipeline, retrieve instructions from the correct branch path, and load these instructions into the pipeline. Misprediction is likely in loops since the branch is taken on all but the final iteration of the loop, and history-based branch prediction algorithms will predict the branch taken on the final iteration. The resulting branch misprediction is repeated every time the loop is entered. For nested loops, the inner loop is entered on each iteration of the outer loop, and the performance hit attributable to mispredictions can be significant.

Program performance can also be degraded by the overhead necessary to set up and terminate each loop. For nested loops, this overhead is multiplied, since the cost is incurred each time the instructions of the outer loop are repeated. If the outer loop repeats 100 times, the overhead for the inner loop is incurred 100 times. The smaller the loop body is, relative to this overhead, the greater the efficiency cost of the loop.

A number of methods have been developed to improve the efficiency with which loops (nested or otherwise) are implemented. For example, software pipelining takes advantage of the fact that the loop body instructions are repeated on each iteration of the loop by implementing the instructions for different iterations of the loop in parallel. In a loop body of three instructions, the first instruction may operate on variables for the $i^{th}$ pass through the loop ("iteration"), while the second and third instructions are implemented with variables from the $(i-1)^{st}$ and $(i-2)^{st}$ iterations.

Under certain circumstances, the overhead cost of nested loops may be mitigated somewhat by "unrolling and jamming" the outer loop. Here, the instructions of the outer loop body for sequential iterations are combined for processing in a single iteration of a modified loop index. Each iteration of the outer loop then executes instructions for multiple, sequential values of the modified loop index, including the inner loop instructions. In addition, the outer loop instructions may be rearranged within the expanded loop body, instruction dependencies permitting, to further streamline execution of the loop.

These methods, where applicable, increase the size of the loop body. The size of the loop body determines the number of instructions (scope) that a compiler can consider simultaneously, for implementing an optimization process. To the extent that these techniques increase the number of instructions in the loop body, they may enable additional compiler optimizations.

Despite their potential advantages, the above described techniques for handling loops are typically limited. For example, loop overhead is only reduced to the extent an outer loop can be unrolled, and this may be limited by dependencies between the inner and outer loop instructions. In addition, it is often practical to implement loop unrolling and similar techniques for only the two inner most loops of a set of nested loops. Some of these limitations are not present in perfectly nested loops, but imperfectly nested loops are very common and subject to most of these limitations.

SUMMARY OF THE INVENTION

The present invention is a method for software pipelining nested loops. In accordance with the present invention, the inner and outer loops of a nested loop are combined to form a merged loop. One or more operations from the merged loop are conditioned to be activated on selected passes through the merged loop.

In one embodiment of the invention, instructions from the inner and outer loops are merged and outer loop instructions are selectively activated using predication. A predicate condition is defined for each predicate so that the predicate condition is true when the associated instruction is to be activated.

BRIEF DESCRIPTION OF THE DRAWINGS

The present invention may be understood with reference to the following drawings in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well known methods, procedures, components, and circuits have not been described in detail in order to focus attention on the features of the present invention.

The present invention provides a method for combining operations from two or more nested loops into a merged loop and software pipelining the merged loop. This software pipelined merged loop offers multiple advantages over the nested loop structure from which it is formed. For example, the loop overhead penalty associated with initiating and terminating the inner loop on each iteration of the outer loop(s) is significantly reduced as the number of separate loops in the nested structure are reduced. For a pair of nested loops pipelined in accordance with the present invention, the inner loop overhead cost is incurred only once. The branch mispredictions associated with the individual loops in the nested structure are likewise reduced as the number of loops is reduced. The merged loop has a larger loop body, which increases the instruction scope to which various compiler optimizations may be applied. The merged loop also makes better use of processor resources and increases the opportunities for prefetching data.

In one embodiment of the present invention, these and other advantages are provided by combining instructions from two or more loops into a merged loop and associating a predicate with selected instructions in the merged loop. The predicate condition for a selected instruction is chosen to activate the instruction (or results generated by the instruction) during appropriate iterations of the merged loop. For example, the predicate conditions for an instruction from a given loop may be based upon a test from a loop that is internal to the given loop in the original nested structure. Other embodiments of the invention may employ other methods to selectively activate outer loop instructions or their effects.

The method of the present invention may be better understood with reference to standard software pipelining techniques. A pseudo code representation of a counted Do loop is:

```
DO (initialize(L), test(L), update(L))
  a                                      Loop (I)
  b
ENDDO
e
```

In this example, "DO ()" is the loop instruction, instructions "a" and "b" form the loop body, and "ENDDO" terminates the loop. The loop variable, L, tracks the number of iterations of loop(I), initialize(L) represents its initial value, and update(L) indicates how L is modified on each iteration of the loop. Test(L) is a logical function of L, e.g. L==LMAX, that terminates loop (I) when it is true, passing control to instruction "e". Other types of loops, e.g. "WHILE" and "FOR" loops, follow a similar pattern, although they may not explicitly specify an initial value, and the loop variable may be updated by instructions in the loop body.

Figure 1:
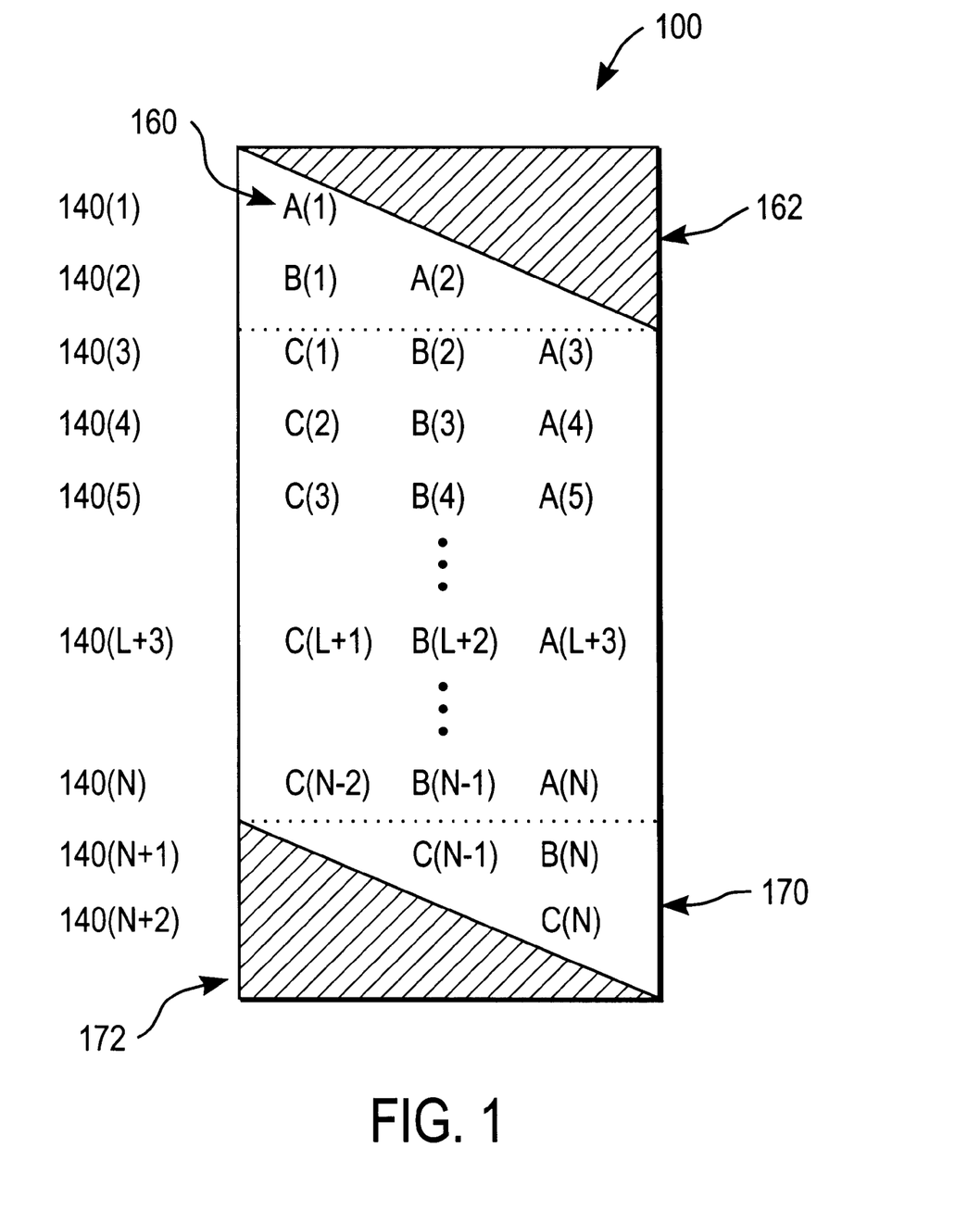
FIG. 1 represents a loop following software pipelining.

FIG. 1 represents loop (I) following software pipelining. Here, it is assumed that source code instructions a, b translate to machine language instructions A, B, and C. In a software pipeline 100, the different instructions correspond to the stages of a pipeline. Instructions in a given row of pipelined loop 100 are processed concurrently, and each instruction is evaluated for increasing values of the loop variable L in sequential rows. For purposes of illustration, the loop variable is indicated in parenthesis following each instruction. For example A(1), B(3), and C(N−2) represent instructions A, B, and C evaluated using operands appropriate for the $1^{st}$, $3^{rd}$, and N-$2^{nd}$ iterations through the loop.

During a prolog 160, the software pipeline 100 is filled. Thus, at cycle 140(1), instruction A is executed using the operands appropriate for L=1, e.g. A(1). At cycle 140(2), instructions A and B are executed using operands appropriate for L=2 and L=1, respectively, e.g. A(2), B(1). At 140(3), A(3), B(2), and C(1) are executed. During prolog 160, resources associated with instructions B and/or C are not utilized. For example, if A, B, and C are floating point instructions and loop 100 is executed in a processor having four floating point units (FPUs), three FPUs are idle at cycle 140(1), two are idle at cycle 140(2) and one is idle at cycle 140(3). Idle processor resources (waste 162) represent one component of loop overhead.

At cycle 140(3), the software pipeline is finally filled, and instructions A, B, and C are evaluated concurrently for different values of L through cycle 140(N). For cycles 140(3)–140(N) the slots of software pipeline 100 are full. At cycle 140(N), instruction A has been evaluated for all N iterations of loop (I).

At cycles 140(N+1) and 140(N+2), software pipeline 100 empties as instructions B and C complete their N iterations of loop 100. These cycles form an epilog 170 of software pipeline 100 for which resources associated first with A and then with B are idled. Idle processor resources (waste 172) represent another component of loop overhead.

The significance of loop overhead for a given loop depends on the number of times the loop is iterated each time it is entered, the number of instructions in the loop, and the number of times the loop is entered. The first two factors determine the number of rows for which the software pipeline 100 is full relative to the number of rows in the epilog and prolog, e.g. the overhead. The third factor determines the number of times the overhead is incurred. In general, a loop that is nested inside another loop is fully iterated and its loop overhead is incurred each time the outer loop is entered.

A pseudo code representation of an outer loop (II) including an inner loop (I) is:

```
DO (initialize(J), test(J), update(J))
  g
    DO(initialize(L), test(L), update(L))
      a                                    Loop(I)   Loop(II)
      b
    ENDDO
  h
ENDDO
```

In the disclosed example, outer loop (II) includes instructions g, h and loop (I) within its loop body. Test(L) and test(J) represent loop termination conditions L==LMAX and J==JMAX. Thus, each repetition of loop (II) executes instruction g, followed by the iterations of loop (I) (instructions a and b), followed by instruction h. Loop index J is then incremented and the process repeated up to J=JMAX. When nested loop (II) is compiled, loop(I) is generally software pipelined in the manner described in conjunction with FIG. 1.

Figure 2A:
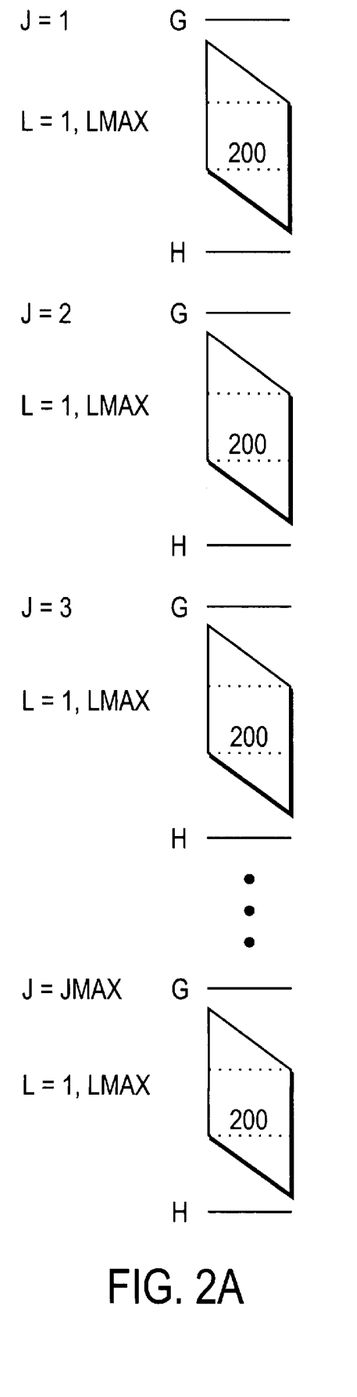
FIGS. 2A and 2B represent nested loops following conventional software pipelining methods.

FIG. 2A represents the JMAX iterations of outer loop (II). For purposes of illustration, it is assumed that source code instructions g, h are translated to assembly instructions G, H. For J=1, instruction G of outer loop (II) is executed, followed by LMAX iterations of loop (I) (parallelogram 200), followed by instruction H of outer loop (II). This process is repeated for J=2 through JMAX. As indicated, each time loop (I) is entered, loop overhead is incurred in the form of unused instruction slots associated with prolog 160 and epilog 170 (FIG. 1).

In the example of FIG. 2A, instruction A is assumed to depend on instruction G. and instruction H is assumed to depend on instruction C. Thus, instruction G, loop(I), and instruction H are executed sequentially. FIG. 2A also represents the case where instructions A, B, and C fully utilize processor resources, e.g. FPUs, that are also required by instructions G and H.

Figure 2B:
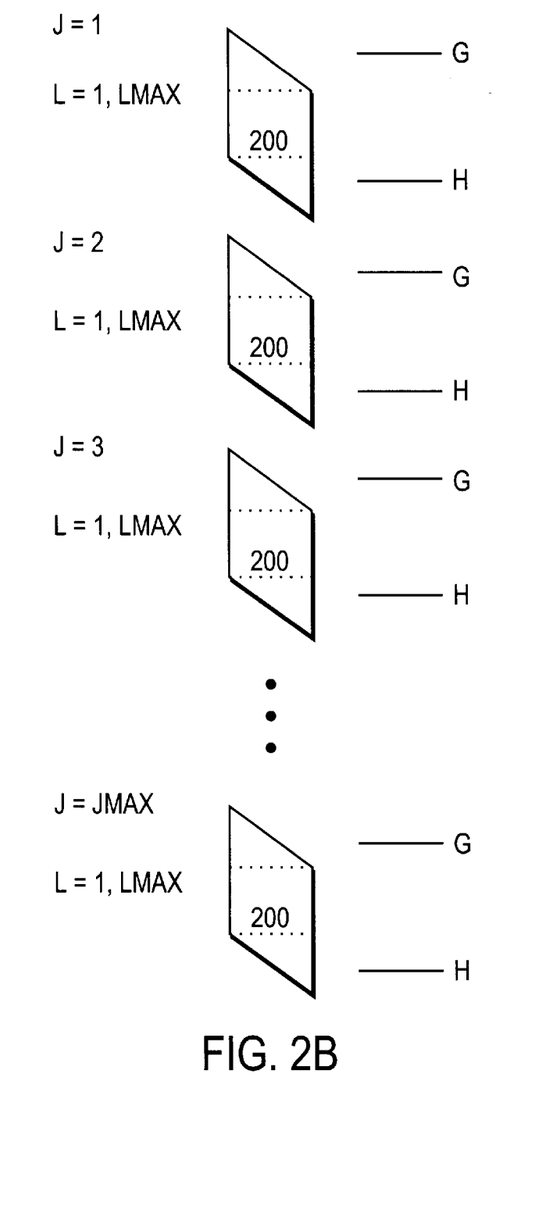

FIG. 2B represents nested loops (I), (II) where instructions G and H can be processed concurrently with inner loop instructions A and C, respectively, e.g. A does not depend on instruction G, instruction H does not depend on instruction C, and sufficient processor resources are available to process all instructions. This provides some speed up in the processing of nested loops (I), (II). However, it does not address the performance loss associated with repeated prologs and epilogs of loop (I). Nor does it address the branch mispredictions associated with terminating loop (I) for each iteration of outer loop (II).

The present invention allows two or more loops to be merged and software pipelined as a single loop, increasing the scope of instructions available for compiler optimizations, reducing the overhead associated with filling and emptying the software pipeline, and reducing branch mispredictions attributable to repeated entry and exit of the inner loop.

A pseudo-code representation of nested loops (I), (II) modified in accordance with one embodiment of the present invention is:

```
JITER = [(JMAX - JSTART)/JINC] + 1
LITER = [(LMAX - LSTART)/LINC] + 1
J = JSTART - JINC
L = LSTART
DO I = 1, JITER*LITER, 1
    IF (L .EQ. LSTART) THEN
        J = J + JINC
        OUTERLOOP_TOP
    ENDIF
    INNERLOOP_BODY
    L = L + LINC
    IF (L .GT. LEND) THEN
        OUTERLOOP_BOTTOM
        L = LSTART
    ENDIF
ENDDO
```

Outer loop instructions g and h, represented by OUTERLOOP_TOP and OUTERLOOP_BOTTOM, respectively, and inner loop instructions a and b, represented by INNERLOOP_BODY, are combined in a single, merged loop. A composite loop variable, I, for the merged loop, varies from 1 to JITER*LITER, and conditionals are inserted in the merged loop. In the above example, the conditional, IF(L .EQ. LSTART), picks up those iterations of the merged loop for which the inner loop of the original nested structure is reentered, e.g. L .EQ. LSTART. When this conditional is true, J is incremented and OUTERLOOP_TOP instruction(s) is activated. Otherwise, these steps are skipped. Similarly, the conditional, IF(L.GT. LEND), picks up those iterations of the merged loop for which the inner loop of the original nested structure is exited. When this conditional is true, OUTERLOOP_BOTTOM instruction(s) is activated and L is reinitialized. Otherwise, these steps are skipped.

In the disclosed embodiment, the outer loop instructions are executed only for those iterations of composite variable I for which the original outer loop variable changes, i.e. prior to entering the inner loop and subsequent to completing the inner loop. The resulting merged loop may be software pipelined into a compact structure that significantly reduces loop overhead for the inner loop and provides a larger loop body on which additional optimizations may be implemented.

The present invention may be implemented using variations on the approach described above. In certain cases, references to the inner and outer loop variables to activate the conditionals may be eliminated. For example, where L varies from 1–10 and J varies from 1–10, the merged loop variable I goes from 1–100. Outer loop instructions can be activated on iterations for which I Mod 10 equals 0. In addition, a single conditional may be used to test for the end of the inner loop and activate the instructions represented by OUTERLOOP_BOTTOM and OUTERLOOP_TOP. Other variations will be apparent to persons skilled in the art and having the benefit of this disclosure.

Figure 3:
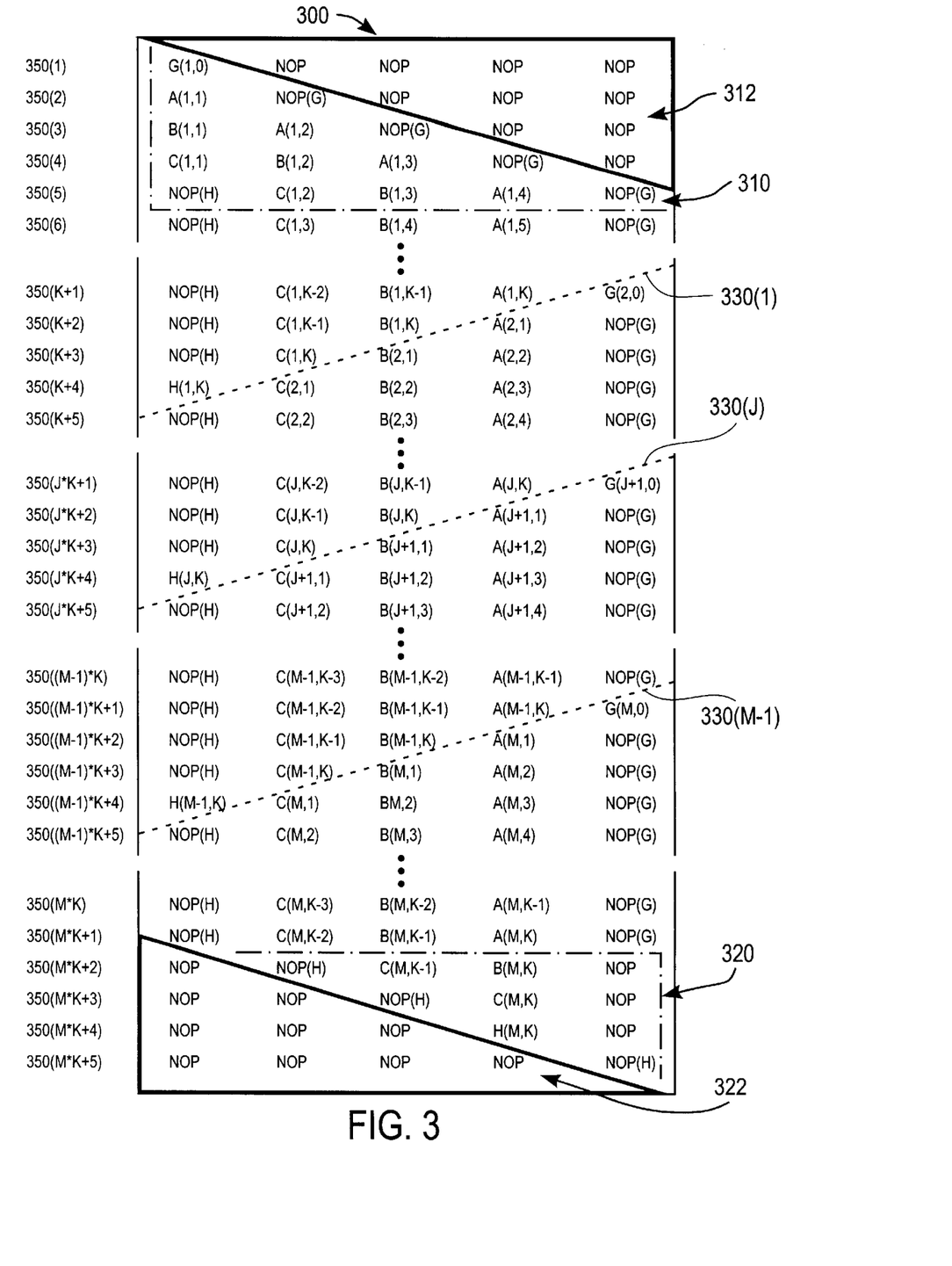
FIG. 3 represents a nested loop that has been software pipelined using a method in accordance with the present invention.

FIG. 3 is a schematic representation of nested loops (I), (II) that have been modified and pipelined as a single loop in accordance with the present invention. In order to illustrate the flow of instructions through pipeline 300, each instruction is identified by a pair of indices (J, L). These indices indicate that the instructions are evaluated using operands suitable to the $J^{th}$ iteration of the outer loop and the $L^{th}$ iteration of the inner loop. For example, A(1,3) refers to instruction A when it is executed using operands appropriate for the first iteration of the outer loop (J=1) and the third iteration of the inner loop (L=3). It is emphasized that software pipeline 300 is based on the single merged loop for which a single loop index I is operative. I varies between 1 and JITER*LITER to accommodate all combinations of inner and outer loop iterations in a single loop that is formed by merging outer loop (II) and inner loop (I) to a single loop with instructions G, A, B, C, H. In the disclosed example, JMAX=M and LMAX=K. The outer and inner loop indices are provided to facilitate tracking the instructions.

For J=1, instructions G, A, B, C, H that form the merged loop are loaded into the slots of a software pipeline 300 during a prolog 310. These instructions are subsequently drained from merged loop 300 in an epilog 320, when J=JMAX=M. Wasted instruction slots 312 and 322 are associated with prolog 310 and epilog 320, but not with the intervening increments of outer loop index J. During loading, G is activated for cycle 350(1) and deactivated for the next K cycles 350(2)-350(K+1), e.g. while the instructions of inner loop complete their first K iterations. The inactive state of G is indicated by no-operations (NOP(G)) in FIG. 3. A place holder for H (NOP(H)) is loaded into software pipeline 300 during prolog 310, but H is not activated until cycle K+4, following completion of the K iterations of inner loop (I).

Dashed lines 330(1), 330(2) . . . 330(J−1) indicate where in software pipeline 300 instructions transition between different values of outer loop index J occur. For example, G is activated at cycle K+1, when the first instruction of the inner loop body has completed its first K iterations, A(1,K). In effect, G is turned on, temporarily, before the instructions of inner loop (I) begin a second set of K iterations at cycle K+2. At cycle K+4, when the last instruction of the inner loop body has finished its first K iterations, H is activated. Thus, H is turned on following completion of a full cycle of inner loop instructions.

Cycles K+1 through K+4, spanned by line 330(1), demonstrate one of the advantages of the present invention. Instead of draining instructions from software pipeline 300 when outer loop variable J normally would increment, the present invention selectively activates the outer loop instruction(s) while continuing to process inner loop instructions. The timing with which the outer loop instruction(s) is activated takes into account any dependencies between the outer and inner loop instructions. In the illustrated example, it is assumed that instruction A depends on G and H depends on C. Accordingly, G(2,0) is activated in software pipeline during cycle K+1, when the $K^{th}$ iteration of A for the $J=1^{st}$ iteration of outer loop (II) is completing. This allows G to complete before A(2,1), e.g. the first iteration of A for J=2, is processed. Thereafter, the first instances of instructions B and C for the J=2 iteration of outer loop (II) occur in cycles K+3 and K+4, respectively.

Thus, software pipeline 300 is uninterrupted as sequential passes through inner loop instructions are processed. In particular, there is no need to drain and refill software pipeline 300 with inner loop instructions before and after executing G. Similarly, H is activated at cycle K+4, after the last iteration of instruction C for the J=1 loop has completed.

Merged software pipeline 300 also eliminates most branch mispredictions associated with the termination condition, Test(L). These mispredictions are substantially eliminated by scheduling repeated iterations through the instructions of inner loop (I) sequentially and adjusting the index values as needed. Also, software pipeline 300 is wider than pipeline 200, since outer loop instructions G and H are implemented by previously unused resources. Merged loop pipeline 300 thus provides the compiler with greater scope (more instructions) for various other compiler optimizations.

FIG. 3 represents nested counted loops that have been modified in accordance with the present invention, but the present invention is applicable to nested loops of any type. For example, nested loops that include various types of non-counted loops may be merged and pipelined using the present invention. The loop variables tested by these loops to determine when to terminate may be adjusted by one or more operations within the loop, in contrast to the simple increment/decrement scheme of counted loops. In this more general case, a composite loop variable for the merged loop reflects the counted/non-counted nature of the component loops, and the loop test for the merged loop is the logical AND of the loop tests of the component loops. As in the counted loop example, the loop test(s) of the inner loop(s) is monitored to determine when operations of the outer loop(s) should be activated. For example, OUTERLOOP_TOP operations are activated when the inner loop variable is initialized, and OUTERLOOP_BOTTOM operations are activated when the inner loop test evaluates true.

Figure 4:
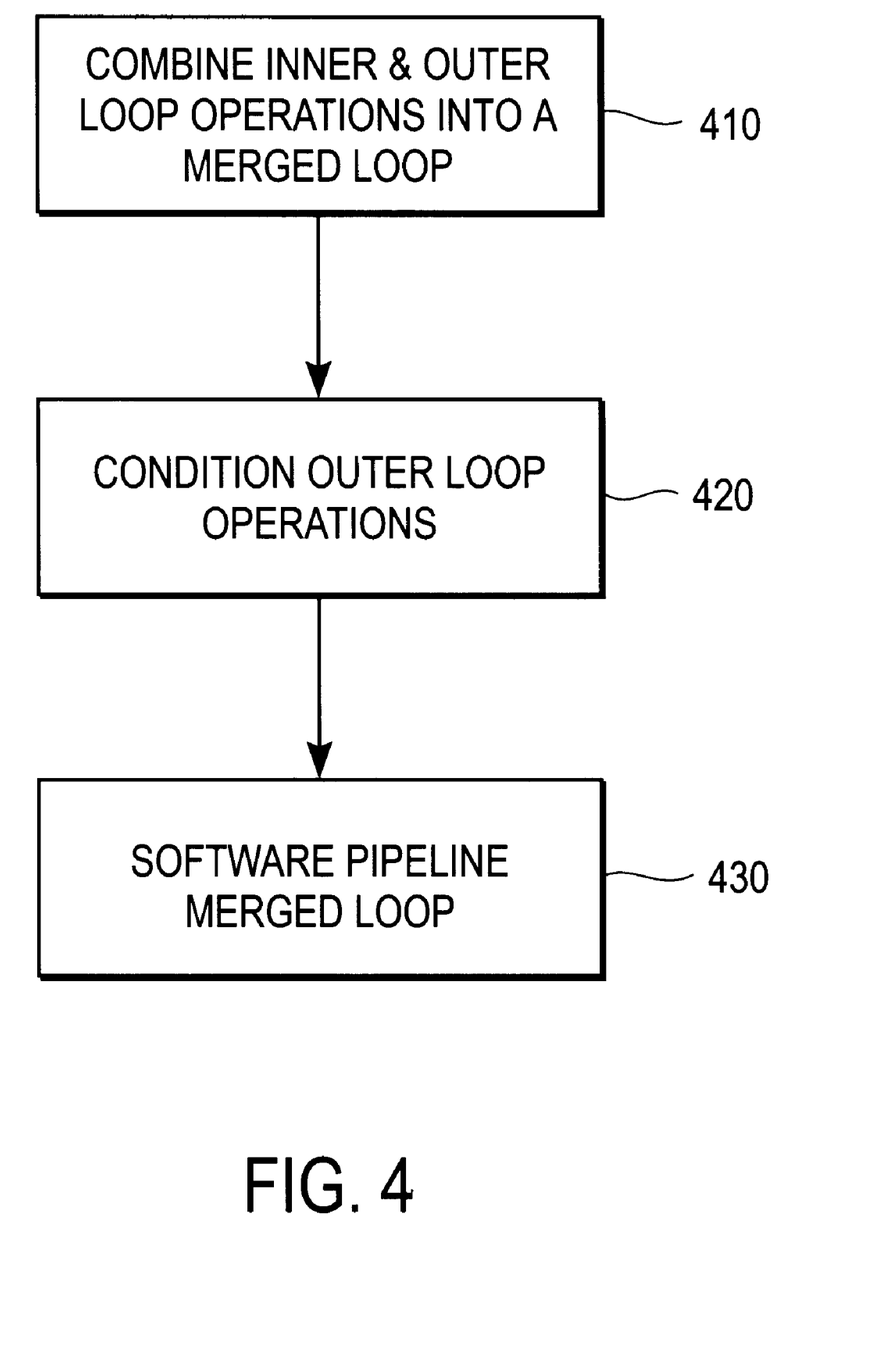
FIG. 4 is a flowchart representing an overview of the method for software pipelining nested loops in accordance with the present invention.

FIG. 4 is a flow chart showing an overview of a method 400 in accordance with the present invention for pipelining nested loops. At step 410, the inner and outer loops are combined to form a merged loop. Selected outer loop operations are then conditioned 420 so they are activated when appropriate during processing of the merged loop. In one embodiment of the invention, outer loop instructions may be selectively activated in the merged loop through predication, using appropriate predicate conditions, e.g. FIG. 3. In another embodiment, outer loop instructions may be executed on each iteration of the merged loop. In this embodiment, the results of the instructions may be committed on only selected iterations using, for example, conditional moves. The present invention is not limited to any particular method for selectively activating outer loop instructions or their effects on the program.

At step 430, the merged loop is software pipelined. This is typically done at compile time as part of the optimization procedure. The compiler translates the instructions from source code into machine code (if necessary) and the translated instructions are optimized. Once the merged loop is defined and the outer loop instructions are appropriately conditioned, standard software pipelining methods may be used to complete the process.

Figure 5:
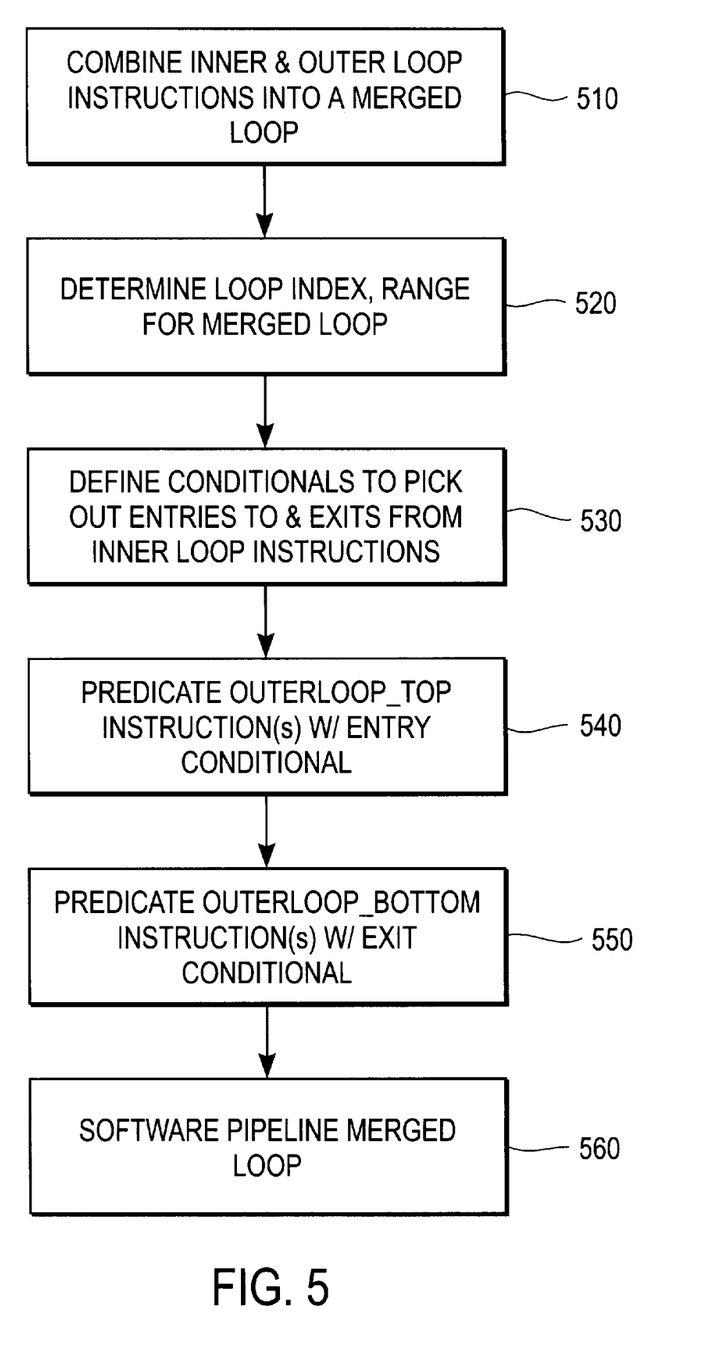
FIG. 5 is a more detailed flowchart showing one embodiment of the method of FIG. 4.

FIG. 5 is a more detailed flowchart of one embodiment of method 400. At step 510, operations from the inner and outer loops are combined to form a merged loop. A loop variable and loop test are determined 520 for the merged loop from the loop variables and tests of the minner and outer loops. Conditionals are defined 530 to pick out where in the merged loop the original inner loop is entered and exited (entry and exit conditionals). Operations originating in the outer loop that precede the inner loop are predicated 540 using the entry conditional. Operations originating in the outer loop that follow the inner loop are predicated 550 using the exit conditional. The merged loop is then software pipelined 560. As noted above, this may be done using standard techniques. Moreover, additional compiler optimizations may be applied to instructions of the merged loop to furter enhance performance of the pipelined instructions.

The present invention has been described in detail for the case in which an inner loop has been combined with instructions from an outer loop. Persons skilled in the art, having the benefit of this disclosure, will recognize that the present invention may be used to combine an inner loop with more than one outer loop. In addition, the use of conditionals in general, and predicates, in particular, may be applied to instructions of the inner loop, to further facilitate software pipelining of the merged loop. In the disclosed embodiment, for example, the inner loop instructions may be predicated to turn on selectively during prolog 310, as needed, to fill the instruction slots in software pipeline 300. In addition, the inner loop instructions may be predicated to selectively turn off during epilog 320, as needed, to drain the instruction slots in software pipeline 300.

In the exemplary embodiments, pipelined instructions have been shown executing for sequential values of the loop variable, e.g A(N) B(N+1) C(N+2). This is not always possible since instructions may have relatively long latencies, in which case dependent instructions must be loaded into the pipeline in a manner that accommodates the latency. For example, if A takes three clock cycles to complete and B depends on A, the instructions may be scheduled onto the pipeline as follows: A(N) B(N+3) C(N+4). The present invention may be applied to nested loops, whether or not such dependency issues exist.

It is further noted that the arrangement of instructions within a given cycle of software pipeline 300 follows a standard form for indicating the filling and emptying of the instruction slots. It is noted, however, that the instruction dependence is reflected in the relative placement of rows of instructions, rather than the placement of individual instructions within a given row. Accordingly, one embodiment of software pipeline 300 may be represented in an alternative form that emphasize the role of predication in turning on and off both inner and outer loop instructions.

P(1)*G P(2)*A, P(3)*B . . . P(J)*INST . . . P(M)*H.

In this representations, predicates (conditionals) for the different instructions are represented by P(J), where the index is included to distinguish predicates for different instructions. The various predicates activate/deactivate their associated instructions as necessary to fill the software pipeline and execute outer loop instructions at appropriate junctures in the merged loop. Predicate conditions associated with each instruction are defined to activate/deactivate the instruction as needed.

There has thus been provided a method for software pipelining nested loops by combining instructions from the inner and outer loops of the nested loop structure into a merged loop. Conditionals are added to the outer loop instructions in the merged loop to selectively activate these instructions where appropriate. The merged loop, including the conditionals, is then software pipelined using standard compiler methods.

What is claimed is:

1. A method for processing nested inner and outer loops comprising:
    forming a merged loop from the inner and outer loops; and
    conditioning one or more operations from the merged loop to be activated on selected iterations of the merged loop.

2. The method of claim 1, wherein conditioning comprises:
    identifying one or more instructions from the merged loop; and
    predicating the one or more merged loop instructions.

3. The method of claim 2, wherein predicating comprises:
    identifying a loop test and initial loop variable for the inner loop;
    defining a first predicate that is true when the loop test is satisfied; and
    defining a second predicate that is true when the loop variable is in its initial state.

4. The method of claim 1, wherein conditioning comprises:
    identifying one or more results associated with the one or more merged loop operations; and
    conditioning the one or more results to be available to instructions of the merged loop on selected iterations of the merged loop.

5. The method of claim 1, wherein conditioning comprises conditioning one or more instructions from the merged loop to be active on selected iterations of the merged loop.

6. The method of claim 1, wherein conditioning comprises conditioning one or more results associated with one or more instructions from the merged loop to be available on selected iterations of the merged loop.

7. A method for software pipelining instructions from inner and outer loops of a nested loop comprising:
    combining operations of the inner and outer loops to form a merged loop; and
    predicating one or more operations of the combined loop to activate the predicated instructions on selected iterations of the merged loop.

8. The method of claim 7, wherein combining instructions comprises:
    defining a merged loop body to include operations from the inner and outer loops;
    defining a loop variable for the merged loop body from loop variables of the inner and outer loops; and
    defining a merged loop test from loop tests associated with the inner and outer loops.

9. The method of claim 7, wherein predicating one or more operations comprises:
    defining the predicate to be true according to a selected property of the inner loop; and;
    gating one or more of the outer loop operations with the predicate.

10. The method of claim 9, wherein defining the predicate comprises defining a first predicate to be true when an inner loop test is true.

11. The method of claim 9, wherein defining the predicate condition comprises defining a second predicate to be true when an inner loop variable is initialized.

12. A method for preparing nested inner and outer loops for processing, the method comprising:
    combining operations from the inner and outer loops;
    defining a merged loop variable from loop variables associated with the inner and outer loops;
    defining a merged loop test from loop tests associated with the inner and outer loops; and
    gating one or more operations from the outer loop on a condition derived from the inner loop.

13. The method of claim 12, wherein gating comprises gating one or more operations from the outer loop according to a condition derived from the loop test of the inner loop.

14. The method of claim 12, wherein gating comprises gating one or more operations from the outer loop according to a condition derived from an initial state of an inner loop variable.

15. A method for processing a nested loop of inner and outer loop instructions as a merged loop, the method comprising:
    executing inner loop instructions for a given iteration of the merged loop;
    evaluating one or more conditions according to a loop test and loop variable associated with the inner loop instructions; and
    gating one or more outer loop instructions according to the one or more conditions.

16. The method of claim 15, wherein evaluating comprises:
    evaluating a first condition that is true when the loop test of the inner loop is true; and
    evaluating a second condition that is true when the inner loop variable is in an initial state.

17. The method of claim 15, wherein gating comprises:
    executing one or more outer loop instructions that precede the inner loop instructions when the second condition is true; and
    executing one or more outer loop instructions that follow the inner loop instructions when the first condition is true.

18. A machine readable storage medium on which are stored instructions that may be executed by a processor to implement a method for processing nested inner and outer loops, the method comprising:
    forming a merged loop from the inner and outer loops; and conditioning one or more operations from the outer loop to be activated on selected iterations of the merged loop.

19. The machine readable medium of claim 18, wherein conditioning comprises:

identifying one or more instructions from the outer loop; and predicating the one or more outer loop instructions.

20. The machine readable medium of claim 19, wherein predicating comprises:

identifying a loop test and initial loop variable for the inner loop;

defining a first predicate that is true when the loop test is satisfied; and defining a second predicate that is true when the loop variable is in its initial state.

21. The machine readable medium of claim 18, wherein conditioning comprises:

identifying one or more results associated with the one or more outer loop instructions; and conditioning the one or more results to be available to instructions of the merged loop on selected iterations of the merged loop.

22. A machine readable medium on which are stored instructions that may be executed by a processor to implement a method comprising:

executing an iteration of a merged loop, the merged loop including inner and outer loop operations;

testing a merged loop variable that is derived from an inner loop variable and an outer loop variable; and repeating executing and testing responsive to the merged loop variable having a first value.

23. The machine readable medium of claim 22, wherein testing the merged loop variable comprises comparing the merged loop variable to a value determined from inner and outer loop tests.

24. The machine readable medium of claim 22, wherein executing an iteration of the merged loop comprises executing the outer loop operation if a first condition is met.

25. The machine readable medium of claim 24, wherein executing an iteration of the merged loop comprises:

evaluating a predicate to determine whether the first condition is met; and executing the outer loop operation if the first condition is met.

* * * * *

UNITED STATES PATENT AND TRADEMARK OFFICE
CERTIFICATE OF CORRECTION

PATENT NO.   : 6,192,515 B1
DATED        : February 20, 2001
INVENTOR(S)  : Doshi et al.

It is certified that error appears in the above-identified patent and that said Letters Patent is hereby corrected as shown below:

<u>Column 8,</u>
Line 24, delete "minner" and replace with -- inner --.
Line 34, delete "furter" and replace with -- further --.

Signed and Sealed this

Second Day of April, 2002

Attest:

Attesting Officer

JAMES E. ROGAN
Director of the United States Patent and Trademark Office